Nov. 16, 1965 N. GOODMAN 3,217,443
FISHING EQUIPMENT INCLUDING A RELEASE DEVICE
Filed Oct. 22, 1962
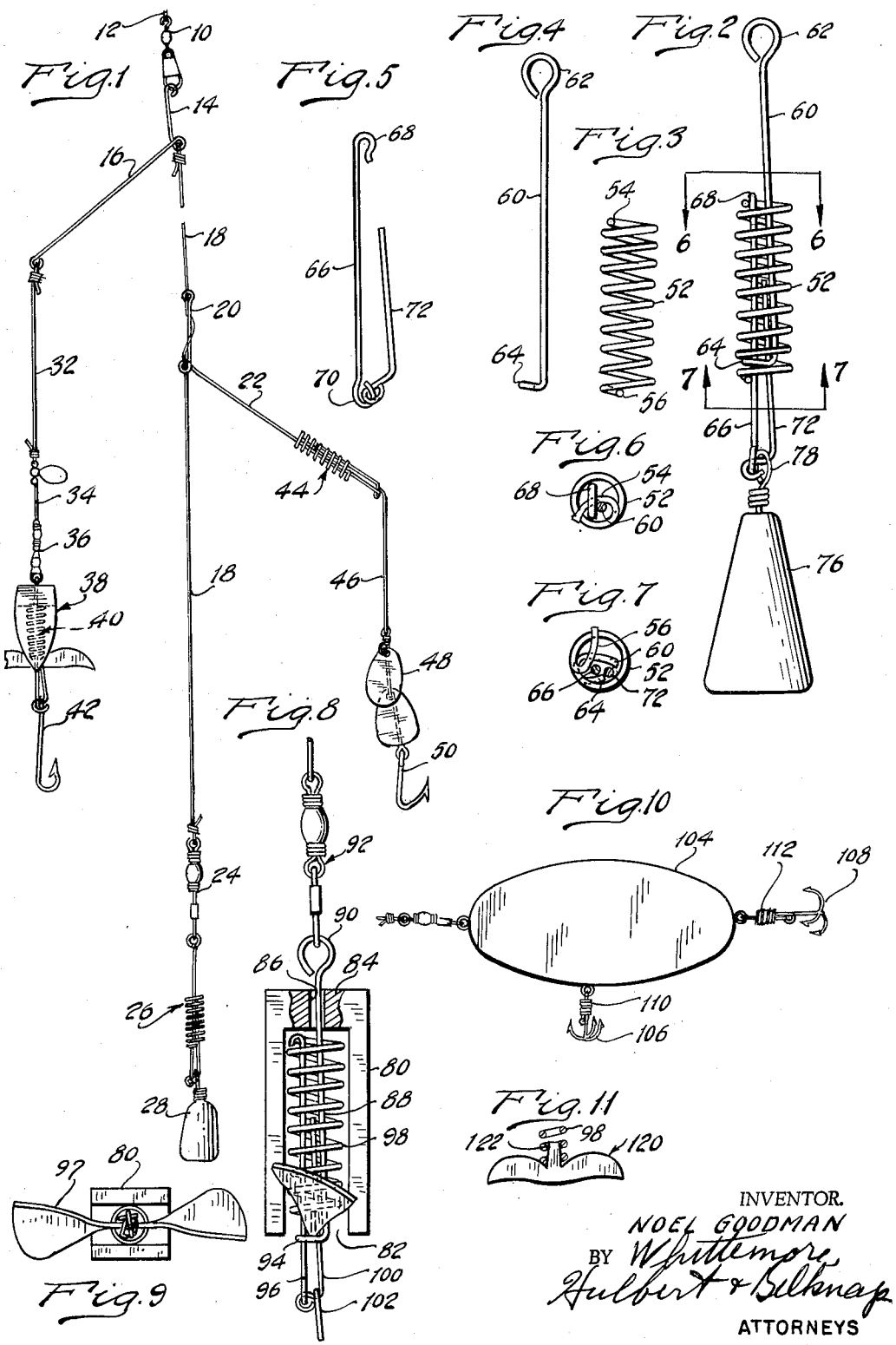
INVENTOR.
NOEL GOODMAN
BY Whittemore,
Hulbert & Belknap
ATTORNEYS United States Patent Office 3,217,443
Patented Nov. 16, 1965

3,217,443
FISHING EQUIPMENT INCLUDING A RELEASE DEVICE
Noel Goodman, 23840 Oxford, West Dearborn, Mich.
Filed Oct. 22, 1962, Ser. No. 232,169
5 Claims. (Cl. 43—42.51)

The present invention relates to fishing equipment including a release device.

It is an object of the present invention to provide fishing equipment including one or a plurality of tension release devices adapted to release snagged portions of fishing tackle so as to prevent loss of equipment connected thereto.

More specifically, it is an object of the present invention to provide fishing tackle including a straight-through extension of a fishing line, a tension release device at the end thereof, and a sinker releasably connected thereto by the tension release device, a first L-shaped wire element having one arm thereof connected in line with the extension, a tension release device including the other arm thereof, and a lure releasably connected to the tension device, a second L-shaped wire element having one arm connected in line with said extension and a tension release device connected to the other arm, said second L-shaped element being connected to the line extension substantially further from the sinker than is said first L-shaped element, and a line including a float comprising a body of buoyant material releasably connected to the last mentioned tension release device.

It is a further object of the present invention to provide a fish lure having tension operated release means to release a hook so as to prevent loss of the lure when the hook is snagged.

It is a further object of the present invention to provide a lure as described in the preceding paragraph comprising a housing, a spring within the housing, and a tension released hook supporting trigger having a free end normally positioned within the spring but movable out of the spring upon predetermined tension to release the trigger for release of the hook.

It is a further object of the present invention to provide a tension release coupling comprising a compression spring, a trigger shaft extending through the spring having means at one end releasably engageable with an end of the spring, a trigger pivoted to the other end of said trigger shaft and having its free end receivable within said spring in operative position, the means at the first end of said trigger shaft being movable through the spring upon release from said spring to provide for setting the tension release device without requiring compression of the spring.

It is a further object of the present invention to provide a coil compression spring, a connector shaft extending through the spring and having means at one end thereof engageable with the adjacent end portion of the spring, a trigger shaft extending through the spring and having means at one end thereof releasably engageable with the opposite end of the spring, a trigger pivoted to the other end of said trigger shaft and receivable in operative relation within said spring, the means at one end of said trigger shaft when released from said spring being movable longitudinally within said spring in order to provide for setting of said device by insertion of said trigger within said spring without requiring compression of said spring.

Other objects and features of the invention will become apparent as the description proceeds, especially when taken in conjunction with the accompanying drawing, illustrating a preferred embodiment of the invention, wherein:

FIGURE 1 is an elevational view of fishing tackle including a sinker and two lures connected by tension release devices.

FIGURE 2 is an enlarged view of the tension release device shown supporting a sinker for release under predetermined tension.

FIGURE 3 is an elevational view of the compression spring employed in the device of FIGURE 2.

FIGURE 4 is an elevational view of the connector shaft of the device shown in FIGURE 2.

FIGURE 5 is an elevational view of the trigger shaft and trigger of the device shown in FIGURE 2.

FIGURE 6 is a sectional view on the line 6—6, FIGURE 2.

FIGURE 7 is a sectional view on the line 7—7, FIGURE 2.

FIGURE 8 is an elevational view, partly in section, of a lure incorporating the tension release device of the present invention.

FIGURE 9 is a bottom plan view of the lure shown in FIGURE 8.

FIGURE 10 is an elevational view showing the tension release devices used in attaching hooks to a spinner plug or the like.

FIGURE 11 is an elevational view of a spinner element.

Referring first to FIGURE 1 there is shown an assembly of fishing equipment comprising a swivel 10 for connection to a fishing line indicated at 12, a straight-through extension of the fishing line comprising one arm 14 of a generally L-shaped element having a second angularly extending arm 16, a leader 18, the arm 20 of a second generally L-shaped element having a second arm 22, a further extension of the leader 18, a swivel connection 24, a tension release device 26, and a sinker 28. Connected to the arm 16 is a leader 32 connected through a spinner unit 34 and a swivel connection 36 to a combined spinner float assembly 38, the assembly including a tension release assembly indicated generally at 40. The tension release 40 supports a fish hook 42. The arm 22 incorporates a third tension release device 44 to which is connected a leader 46 carrying spoon elements 48 and a hook 50. Assembly 38 includes a body of buoyant material causing it to float.

As will subsequently appear, the tension release devices 26, 40 and 44 are adapted to operate upon the application of a predetermined pressure so as to release structure connected thereto. The arrangement is such that if any portion of the fishing tackle becomes snagged or lodged, the particular component thus engaged will be released by operation of the tension release device connected thereto but the remainder of the equipment will not be lost. Thus for example, if the hook 42 becomes snagged the tension release device 40 operates and only the hook 42 is lost. Similarly, if the sinker 28 is snagged the tension release device 26 operates to release the sinker, and if the hook 50 becomes snagged the tension release device 44 operates to release it and the spoons 48.

Referring now to FIGURES 2–7, the operating structure of the tension release device is shown in detail. The tension release device is made up of the three components shown in FIGURES 3, 4 and 5. In FIGURE 3 there is shown an elongated tubular coil compression spring 52. The ends of the spring 52 are bent to at least partially restrict the end openings thereof, the upper end of the spring as indicated at 54 being bent as best illustrated in FIGURE 6, and the lower end 56 being bent as best illustrated in FIGURE 7.

Associated with the spring 52 is a connector shaft 60 having its upper end bent to form an eye 62 for connection to the fishing line or other device for applying tension to the unit. The eye 62 is of a size such that it cannot pass through the restricted opening at the upper end of the spring 52. The opposite end of the connector shaft 60 is bent into the form of an eye 64 and this in turn performs the double function of an abutment engageable with the adjacent end of the spring 52 and also preferably, receives the intermediate portion of a trigger shaft subsequently to be described.

In FIGURE 5 the trigger shaft is shown at 66 and has at its upper end a releasable hook portion 68 adapted to snap over the transversely bent end portion 54 of the spring 52. At its lower end the trigger shaft 66 has a pivot eye 70 which forms a pivot connection for one end of a trigger 72.

The parts are assembled as best illustrated in FIGURE 2, which figure shows a sinker 76 having an eye 78 connected to the trigger 72. It will be observed in this figure that the eye 64 of the connector shaft 60 is engaged between the two adjacent end convolutions of the spring 52 although it ordinarily is engageable with the outer side of the extreme end convolution. However, the eye 64 may be bent to extend into the helical space between convolutions and accordingly, by providing relative rotation between the spring 52 and the connector shaft 60, the abutment and eye 64 thereof may be moved longitudinally of the spring and thus vary the tension required to release the trigger.

As best seen in FIGURE 2, the trigger shaft 66 extends completely through the spring and has an intermediate portion engaged in the eye 64 of the connector shaft 60. The trigger 72 extends upwardly into the compression spring 52 a substantial distance. If tension is now applied between the connector 60 and the sinker 76, forces are applied to the compression spring at opposite ends thereof, putting the spring under compression. As the spring collapses the free end of the trigger 72 approaches the lower end of the spring 52, as seen in FIGURE 2. When the tension reaches a predetermined value the end of the trigger 72 emerges from the spring 52 and is free to swing to a position in which it releases the sinker 76.

The hook 68 at the upper end of the trigger shaft 66 was referred to as releasable and this constitutes an important feature of the present invention. When it is desired to set the tension release device the trigger shaft is pressed upwardly to disengage the hook 68 from the end portion 54 of the spring 52. The hook 68 is dimensioned such that it may move downwardly within the opening through the tubular spring 52 to a position such that the free end of the trigger 72 is located below the lower end of the spring while the spring is in its fully extended position. At this time the trigger 72 may be engaged with any suitable article such for example as the sinker 76, a lure, or the like, after which the trigger may be inserted freely into the lower open end of the spring 52 and moved upwardly together with the trigger shaft 66 until the hook 68 emerges above the upper open end of the spring 52. At this time the hook 68 is aligned with the spring portion 54 and moved downwardly until it snaps over the spring portion 54.

At this time tension applied between the connector eye 62 and the sinker 76 is applied as compressive forces to opposite ends of the compression spring 52, specifically, through the action of the releasable hook 68 and the eye 64 of the connector shaft 60.

Inasmuch as the tension release device is often made in quite small sizes which nevertheless require substantial tension for release, the provision of the releasable hook 68 on the trigger shaft permits setting the tension device without the necessity of compressing the spring 52.

In FIGURES 2–7 the connector 60 is shown essentially as an elongated wire having its end portions bent to form the connector eye 62 and the eye 64 which constitutes a combined spring abutment and guide loop for the trigger shaft. However, the connector 60 may be otherwise formed as for example, as shown in FIGURE 1 where the connector element of the tension release devices 30 and 44 constitutes single arms of the L-shaped elements having arms 14, 16 and 20, 22 respectively.

Referring now to FIGURES 8 and 9 the tension release device is illustrated as built into a lure. In this case the lure constitutes a buoyant housing 80 open at one end as indicated at 82 and open at opposite sides so as to assume the shape of an inverted U. The closed upper end 84 of the housing is provided with an opening 86 therethrough. The tension release device shown in this figure is genereally similar to the tension release device of FIGURE 2, and comprises a connector shaft 88 which extends through the opening 86 and terminates at its upper end in an eye 90 adapted to be connected to the snap swivel 92. At its lower end the connector shaft is provided with an eye 94 opening longitudinally of the shaft, and receiving an intermediate portion of the trigger shaft 96. A spinner element 97 has a reduced intermediate portion which is received between the eye 94 and the adjacent end of the spring 98, and is retained against separation between the connector shaft 88 and the trigger shaft 96. The upper end of trigger shaft 96 is provided with a hook such as the hook 68 seen in FIGURE 5, which is readily engageable and disengageable with the top convolution of the spring 98. A trigger 100 is pivoted to the lower end of the trigger shaft 96 and extends upwardly within the spring 98 as in the release device of FIGURE 2. The trigger 100 carries a hook, a portion of which is indicated at 102. Obviously, if the hook is snagged, tension applied between the hook and the eye 90 of the connector shaft compresses the spring 98 until the trigger is released, thus freeing the structure of the lure from the hook.

The tension release device may be made in any practical size, including extremely small sizes suitable for direct connection to hooks. In FIGURE 10 there is illustrated a lure 104 which may be in the form of a plug, float, spoon or the like, to which a plurality of hooks as indicated at 106 and 108 may be releasably connected by tension release devices indicated at 110 and 112 respectively.

It is of course apparent that the tension under which the device is adapted to release will be determined largely by the spring. However, in making adjustments it is convenient to cut off portions of the trigger until the device releases at the required tension.

In FIGURE 11 there is illustrated at 120 a variation of spinner including at its center a projection 122 which is adapted to extend upwardly into the lower end of the tubular spring, such for example as the spring 98 of FIGURE 8. The projection 122 is preferably dimensioned so that it requires pressure to insert it within the spring and accordingly, it is retained therein by a pressure fit. It is of course also positively retained against displacement therefrom when the trigger is set by its engagement between the eye 94, the end of the spring 98, the trigger shaft 96, and the connector shaft 88.

The drawing and the foregoing specification constitute a description of the improved fishing equipment including a release device in such full, clear, concise and exact terms as to enable any person skilled in the art to practice the invention, the scope of which is indicated by the appended claims.

What I claim as my invention is:

1. A tension release coupling comprising a tubular coiled compression spring having its ends bent to restrict the opening therethrough, a connector shaft formed of a single straight wire element extending substantially through said spring and beyond one end thereof, abutments at opposite ends of said connector shaft shaped to prevent direct movement thereof through said spring, a trigger shaft formed of a single straight wire element extending through said spring and movable longitudinally therein, releasable hook means at one end of said trigger a spring-loaded cam rod reciprocably mounted in said tubular housing,
said primary cam having latch-receiving means thereon,
a latch bar slidably mounted in said cam rod and having one end portion adapted to engage said latch-receiving means for holding said rod section in said cocked position,
a trigger member shiftably connected to said grip section and having a portion thereof connected to the other end of said latch whereby shifting movement of said trigger member in one direction will move said latch-end portion of said latch bar from engagement with said latch-receiving means on said cam to release said rod section from its cocked position,
said spring loaded cam rod having abutment means at one end portion thereof for cooperation with the cam means of said primary cam when said rod section is moving between said cocked and released position,
a shiftable shank mounted adjacent the forward end of said grip member having an overhanging outer end shaped and adapted to engage the line control means of a push button spin cast reel and having an inner end operatively associated with the end portion of said cam rod (opposite from the end having said abutment means) to control shifting of said shank, whereby upon release of said rod section from its cocked position, by said latch bar, said cam means extending from said primary cam will engage the abutment of said cam rod to release said overlying portion of said shank from engagement with the line control means of the push button spin cast reel.

2. An automatic casting rod for use with a push button actuated spin cast fishing reel comprising in combination,
a grip section,
an elongated, tubular housing secured to said grip section in substantially offset parallel relation thereto,
a spring housing integral with the forward end of said tubular housing,
said spring housing having side plates and a transversely disposed cover portion extending between said side plates,
said cover portion having a longitudinally disposed slot formed therein,
a primary cam having a main body portion and a pair of laterally spaced lobes extending outwardly therefrom, said lobes having edge portions providing cam surfaces,
said primary cam being pivotally mounted in said spring housing for rotation about its transverse axis,
a rod tip section rigidly secured at its inner end portion to the main body portion of said primary cam, said rod tip section extending through said slot in said cover,
a flat spiral spring under tension, mounted in said spring housing, one end of said spring being connected to a lower end portion of said rod tip section disposed within said spring housing, the other end of said spring being connected to said spring housing for biasing said rod tip section from a cocked position in which said rod tip section is disposed substantially perpendicular to the tubular housing to a release position in which said rod tip section is disposed in substantial alignment with said tubular housing,
a spring-loaded cam rod reciprocably mounted in said tubular housing,
said primary cam having latch means thereon,
a latch bar slidably mounted in said cam rod and having one end portion adapted to engage said latch means on said primary cam for holding said rod tip section in said cocked position,
a trigger member pivotally connected to said grip section and having a portion thereof connected to the other end of said latch bar whereby pivotal movement of said trigger member in one direction will move said one end portion of said latch bar from engagement with said latch means on said primary cam to release said rod tip section from its cocked position, said spring-loaded cam rod having a shoulder portion at one end thereof for cooperation with said cam surfaces on said lobes when said rod tip section is moving between said cocked and released position,
secondary cam means rigidly mounted on the other end of said cam rod,
a secondary spring-loaded cam rod diagonally mounted in said grip section relative to the longitudinal axis thereof and extending through a bore in said tubular housing, one end of said secondary cam rod being in engagement with said secondary cam and the other end thereof being hook shaped and adapted to engage the line control means of a push button spin cast fishing reel, whereby upon release of said rod tip section from its cocked position by said latch bar said cam surfaces of said lobes will rotate and contact said shoulder portion of said spring-loaded cam rod to move said secondary cam and secondary spring-loaded cam rod to release said hook shaped portion thereof from engagement with the line control means of the bush button spin cast reel.

References Cited by the Examiner
UNITED STATES PATENTS
2,765,568   10/1956   Kozar _____ 43—19
FOREIGN PATENTS
827,107   2/1960   Great Britain.

ABRAHAM G. STONE, *Primary Examiner.*